(12) United States Patent
Thibout et al.

(10) Patent No.: US 11,940,322 B2
(45) Date of Patent: Mar. 26, 2024

(54) DEVICE FOR CLASSIFYING A LIGHT SOURCE

(71) Applicant: THALES, Courbevoie (FR)

(72) Inventors: Paul Thibout, Élancourt (FR); Thierry Midavaine, Élancourt (FR); Guillaume Bloom, Élancourt (FR); Yves Courcol, Élancourt (FR); Olivier Verdy, Élancourt (FR)

(73) Assignee: THALES, Courbevoie (FR)

( * ) Notice: Subject to any disclaimer, the term of this patent is extended or adjusted under 35 U.S.C. 154(b) by 279 days.

(21) Appl. No.: 17/627,573

(22) PCT Filed: Jul. 15, 2020

(86) PCT No.: PCT/EP2020/069993
§ 371 (c)(1),
(2) Date: Jan. 14, 2022

(87) PCT Pub. No.: WO2021/009221
PCT Pub. Date: Jan. 21, 2021

(65) Prior Publication Data
US 2022/0260415 A1    Aug. 18, 2022

(30) Foreign Application Priority Data
Jul. 15, 2019    (FR) ...................................... 19 07907

(51) Int. Cl.
*G01J 1/42*    (2006.01)
*G01J 1/04*    (2006.01)

(52) U.S. Cl.
CPC ........... *G01J 1/4257* (2013.01); *G01J 1/0433* (2013.01)

(58) Field of Classification Search
CPC ....... G01J 1/0433; G01J 1/4257; G01S 3/784; G01S 7/021; G01V 8/10
See application file for complete search history.

(56) References Cited

U.S. PATENT DOCUMENTS 5,914,661 A      6/1999 Gross
2011/0188031 A1  8/2011 Aphek et al.

FOREIGN PATENT DOCUMENTS

WO    WO 2018/065146 A1    4/2018

OTHER PUBLICATIONS

French Search Report, from the French Patent Office in counterpart French Application No. 1907907, dated Feb. 20, 2020.
International Search Report and Written Opinion, issued by International Searching Authority in corresponding International Application No. PCT/EP2020/069993, dated Aug. 5, 2020.

*Primary Examiner* — Tri T Ton
(74) *Attorney, Agent, or Firm* — ArentFox Schiff LLP (57) ABSTRACT

The present invention relates to a device for classifying a light source, comprising:
  a sensor adapted to receive a luminous flux emitted by a light source, the sensor comprising a plurality of pixels grouped in sets, each set comprising a first pixel and a second pixel adjacent to the first pixel,
  each first pixel being adapted to generate a first signal relating to a first portion of luminous flux in a first spectral band received by said first pixel,
  each second pixel being adapted to generate a second signal relating to a second portion of luminous flux in a second spectral band received by said second pixel,
  a computer configured to compare the first and second signals and to classify the emitting light source according to the result of the comparison.

13 Claims, 10 Drawing Sheets

DEVICE FOR CLASSIFYING A LIGHT SOURCE

CROSS-REFERENCE TO RELATED APPLICATIONS

This application is a National Stage Entry of International Patent Application No. PCT/EP2020/069993, filed on Jul. 15, 2020, which claims priority to French Application No. 19 07907, filed on Jul. 15, 2019. The disclosures of the priority applications are incorporated in their entirety herein by reference.

The present invention relates to a device for classifying a light source. The invention also relates to an optronic system comprising such a classification device.

Optronic systems are typically equipped with light flux detection functions, especially laser flux.

In particular, active optronic systems using laser emission are of three types: mono-static, bi-static and point-to-point systems. Mono-static systems are optronic systems with a transmitter and a receiver integrated in the same system or platform. Mono-static systems are, for example, laser rangefinders. Bi-static systems are optronic systems comprising two sub-assemblies: a transmitter and a receiver integrated in separate systems or platforms. Bi-static systems are, for example, laser spot detectors, laser pointer detectors or laser pointers or designators operating in bi-static mode. Point-to-point systems are optronic systems in which a laser directly illuminates the receiver. However, the laser can illuminate the receiver around the periphery of its emission lobe with limited illumination. Point-to-point systems are, for example, laser warning detectors (abbreviated as LWDs) or beamriders.

The detection of laser flux from such optronic systems is subject to many problems.

In particular, one of the issues for laser warning detectors is to reduce the false alarm rate while allowing accurate angular location of the emission source. Solar reflections (e.g. sunlight reflecting off leaves or urban structures) are one of the causes of false alarms. Indeed, from the point of view of the laser warning detector, some solar reflections may have a temporal behaviour close to the signal provided by the laser transmitters. Laser emissions are therefore difficult to identify by algorithms with respect to solar reflections.

In order to reduce the false alarm rate, it is therefore necessary to better distinguish between signals of solar origin and signals of laser origin to be detected.

Laser warning detectors are traditionally used in the form of single detectors or four detectors, so-called four quadrants, or in the form of arrays of several non-multiplexed detectors, which have the ability to measure the temporal shape of the received signal with a high bandwidth. As the temporal shapes of the laser emission and the solar flux are different, such detectors make it easier to classify the illuminance information due to a conventional solar flux or due to the laser emission of a rangefinder. Indeed, the pulse duration and repetition rate of laser emitters are very deterministic, whereas solar reflections are very random in duration, often much slower, with no repetition rate. Thus, an adapted algorithm makes it possible to differentiate between them.

However, such laser detectors do not provide an accurate angular location of the emission source, unlike a laser warning detector using a matrix sensor, which unfortunately generates a higher false alarm rate. Such a laser warning detector with a matrix sensor does not allow the precise temporal shape of the received signal to be given due to its more limited bandwidth, so that fast sun reflections are likely to be classified as a laser signal.

There is therefore a need for a light source classification device that has a low false alarm rate while allowing accurate angular location of the emission source.

To this end, the invention relates to a light source classification device comprising:
  a sensor adapted to receive a luminous flux emitted by at least one light source, the luminous flux being received on the sensor in the form of a spot, the sensor comprising a plurality of pixels grouped in sets, each set comprising at least a first pixel and a second pixel adjacent to the first pixel, each first pixel being suitable for generating a first signal relating to a first portion of luminous flux in a first spectral band received by said first pixel, each second pixel being suitable for generating a second signal relating to a second portion of luminous flux in a second spectral band received by said second pixel, the second spectral band being different from the first spectral band,
  a unit for controlling the size and shape of the spot so that the spot extends over at least one set of pixels of the sensor, and
  a computer configured to compare the first and second signals and to classify the emitting light source according to the result of the comparison.

In other beneficial aspects of the invention, the classification device comprises one or more of the following features, taken in isolation or in any technically possible combination:
  the computer is configured to determine the direction of the emitting light source relative to the device based on the shape and position of the spot on the sensor;
  each set comprises at least a third pixel of the plurality of pixels of the sensor, each third pixel being adapted to generate a third signal relating to a third portion of luminous flux in a third spectral band received by said third pixel, the third spectral band being different from the first spectral band and the second spectral band, the computer being configured to compare the first, second and third signals to classify the emitting light source;
  the arrangement of the pixels in each set is predefined and is advantageously identical from one set to another;
  the first spectral band is a spectral band of interest and the second spectral band is a reference spectral band, each spectral band of interest being centred on a wavelength of interest, each reference spectral band being selected from the group consisting of:
    a spectral band centred on a different wavelength from the or each wavelength of interest,
    a spectral band disjoint from the or each spectral band of interest, and
    a spectral band in which at least one spectral band of interest is strictly included,
  the first pixel comprising a filter suitable for transmitting only the first spectral band, the second pixel comprising a filter suitable for transmitting only the second spectral band;
  the third spectral band is a spectral band of interest centred on a wavelength of interest different from the first spectral band, or a reference spectral band different from the second spectral band, the third pixel comprising a filter adapted to transmit only the third spectral band;

at least one wavelength of interest is between 1.05 microns and 1.07 microns or between 1.50 microns and 1.70 microns, preferably between 1.55 microns and 1.65 microns;

the first pixel comprises a red Bayer matrix filter or a green Bayer matrix filter, the second pixel comprising a blue Bayer matrix filter;

the device comprises a pupil filter upstream of the sensor, the first spectral band being the product of the spectrum of the pupil filter and the spectrum of the filter of the first pixel, the second spectral band being the product of the spectrum of the pupil filter and the spectrum of the filter of the second pixel, the pupil filter preferably being a notch filter in a wavelength range between 380 nanometres and 850 nanometres;

the first spectral band and the second spectral band are disjoint and have wavelengths between 800 nanometres and 900 nanometres.

The invention also relates to an optronic system comprising a classification device as described above.

Other characteristics and advantages of the invention will become apparent upon reading the following description of embodiments of the invention, given only as an example and referencing the drawings which are:

GENERAL EMBODIMENT

In the following, with reference to FIG. 1, the general structure of a light source 11 and an optronic system 12 comprising a classification device 14 is described. The classification device 14 will then be described in more detail in the following description in examples of the first, second and third embodiments.

The light source 11 is capable of emitting a luminous flux in different directions and in particular in the direction of the optronic system 12. The luminous flux emitted by the light source 11 has a spectral emission band BI.

The light source 11 is, for example, a monochromatic emitter such as a laser or a light-emitting diode (abbreviated as LED). In another example, the light source 11 is a low-pressure gas discharge bulb. In yet another example, the light source 11 is a broadband source, such as a flash lamp, the sun, the sky or the scene illuminated by the sky and the sun. In yet another example, the light source 11 comprises artificial lighting using incandescent lamps, fluorescent lamps, high pressure gas discharge lamps, or LEDs combined with fluorescent compounds.

The optronic system 12 is, for example, an active optronic system, such as a mono-static system, a bi-static system or a so-called "point-to-point" system.

Mono-static systems are optronic systems with a transmitter and a receiver integrated in the same system or platform. Mono-static systems are, for example, laser rangefinders.

Bi-static systems are optronic systems comprising two sub-assemblies: a transmitter and a receiver integrated in separate systems or platforms. Sub-assemblies of bi-static systems are, for example, laser spot detectors, laser pointer detectors or laser pointers or designators operating in bi-static mode.

Point-to-point systems are optronic systems that consist of two sub-assemblies: a transmitter and a receiver in intervisibility or on or near a line of sight, where, for example, a laser directly illuminates the receiver. However, the laser can illuminate the receiver around the periphery of its emission lobe with limited illumination. Examples of sub-assemblies in point-to-point systems are laser warning detectors (abbreviated as LWDs) or beamriders or free space optical communication devices.

Advantageously, the optronic system 12 and the light source 11 operate in an outdoor environment on the same scene. A scene is a theatre of operations, i.e. the place where an action takes place. The scene is therefore an extended space with sufficient dimensions to allow an action to take place.

The optronic system 12 is, for example, intended to be integrated into a platform, such as an aircraft, land vehicle, or ship.

The classification device 14 is configured to classify a light source emitting a light flux towards the optronic system 12, such as the light source 11. Classifying a light source means identifying the nature of the light source 11, at least identifying whether the light source 11 is a laser or not (discrimination of a laser threat from the rest of the scene) and, if so, giving if possible the main characteristics of this laser such as its pulse duration and repetition rate in order to try to classify it in a threat category (e.g. rangefinder, pointer, designator or missile guidance system).

The classification device 14 comprises a sensor 20, a control unit 22 and a computer 24.

The sensor 20 is a matrix sensor, i.e. a sensor formed by a matrix of pixels.

The sensor 20 is suitable for receiving a luminous flux emitted by the light source 11. The luminous flux is received on the sensor in the form of a T-spot.

The sensor 20 comprises a plurality of pixels. Each pixel of the sensor 20 that receives a luminous flux is configured to detect either the luminous flux directly, or a variation of luminous flux, or a pulse, or an energy.

The pixels of the sensor are grouped into sets. Each set preferably comprises the same number of pixels.

Each set comprises at least a first pixel P1 and a second pixel P2. The second pixel P2 is adjacent to the first pixel P1.

Each first pixel P1 is adapted to generate a first signal S1 relating to a first portion of luminous flux received by the first pixel P1 in a first spectral band B1.

Each second pixel P2 is adapted to generate a second signal S2 relating to a second portion of luminous flux received by said second pixel P2 in a second spectral band B2. The second spectral band B2 is different from the first spectral band B1.

The signal generated by each pixel is a signal representative of the number of photons per second (also called flux)

or preferably a variation in the number of photons per second or variation in the flux arriving at the pixel.

Each signal has at least one characteristic. The characteristic is for example the signal amplitude.

Advantageously, each set comprises at least a third pixel P3 among the plurality of pixels of the sensor 20. The third pixel P3 is adjacent to at least one of the first or second pixel P2 in the set.

Each third pixel P3 is adapted to generate a third signal S3 relating to a third portion of luminous flux received by said third pixel P3 in a third spectral band B3. The third spectral band B3 is different from the first spectral band B1 and the second spectral band B2.

Advantageously, each set comprises a plurality of pixels, such as several first pixels P1 and/or several second pixels P2 and/or several third pixels P3 and/or pixels different from the first, second and third pixels P1, P2, P3. In this case, each pixel comprises a filter that determines the spectral band corresponding to the pixel.

The arrangement of the pixels in each set is predefined. Advantageously, the arrangement of the pixels in each set is predefined and is advantageously identical from one set to another. For example, the position of the different types of pixels on the sensor 20 is chosen to form a periodic pattern. Advantageously, the different types of pixels are arranged in an interlaced pattern. Alternatively, the arrangement of the individual pixels is pseudo-random.

For example, the positions of the first pixels on the sensor 20 are chosen to form a predefined pattern (e.g. a staggered pattern) and the position of the other pixels, in particular the second pixels, are the positions not occupied by the first pixels (in the example, the gaps in the staggered pattern).

The spot 20 size and shape control unit 22 is configured to control the size and shape of the spot 20 forming on the sensor 20 from the light flux emitted by the light source 11 so that the spot 20 extends over at least one set of pixels of the sensor 20.

The control unit 22 is, for example, an optical device configured to distribute (e.g. defocus) the light flux received by the sensor 20 over several pixels. The control unit 22 comprises, for example, an optical lens, a mechanical defocusing element or an optical diffuser upstream of the sensor 20.

The computer 24 is, for example, a processor. The computer 24 comprises, for example, a data processing unit, memories, a data carrier reader and a human/machine interface, such as a keyboard or a display.

Figure 1:
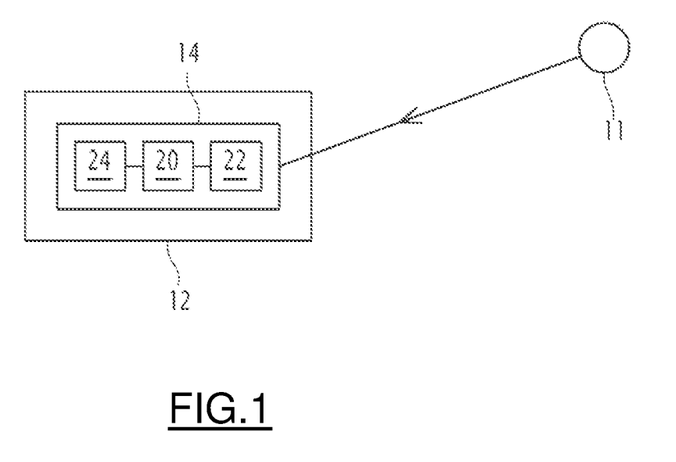
FIG. 1 is a diagram of a light source and an optronic system comprising a classification device.
Figure 2:
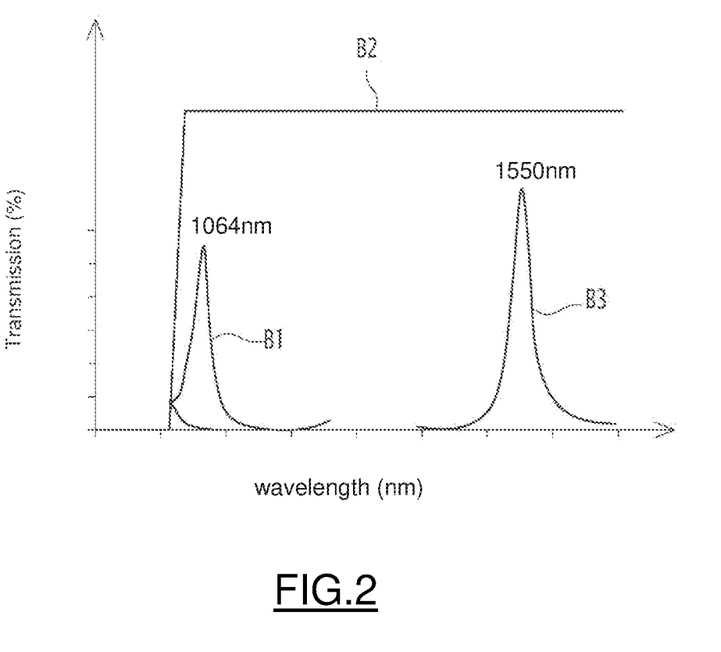
FIG. 2 is a graph showing the spectral profiles of three filters.

In the example shown in FIG. 1, the computer 24 is carried by the optronic system 12. Alternatively, the computer 24 is remote from the optronic system 12 and is installed in an entity that is, for example, on the ground. This makes it possible to offload the processing carried out by the computer 24 outside the optronic system 12.

The computer 24 interacts with a computer program product that comprises an information carrier. The information medium is a medium readable by the computer 24, usually by the data processing unit of the computer 24. The readable medium is a medium adapted to store electronic instructions and capable of being coupled to a bus of a computer system. For example, the readable medium is a floppy disk, optical disk, CD-ROM, magneto-optical disk, ROM, RAM, EPROM, EEPROM, magnetic card or optical card. A computer program product comprising program instructions is stored on the information medium.

The computer program is loadable onto the data processing unit and is adapted to cause a classification method to be implemented when the computer program is implemented on the processing unit of the computer 24.

The following describes the interaction between the light source 11 and the optronic system 12, and the general operation of the classification device 14. The specific operation of the classification device 14 will be described in more detail in the following description in the first, second and third embodiments.

Figure 3:
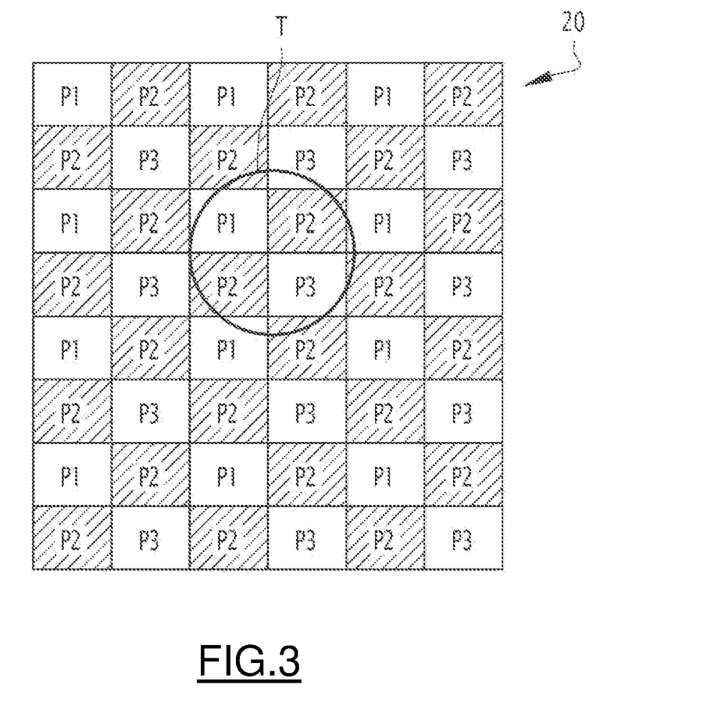
FIG. 3 is a diagram of a sensor receiving light flux in the form of a spot.

Initially, the sensor 20 receives a light flux in the form of a spot T spread over at least one set of pixels of the sensor 20 as illustrated in FIG. 3. In FIG. 3, the spot T extends over a set of four pixels: a first pixel P1, two second pixels P2 and a third pixel P3.

In response, each pixel in the set receiving the light flux generates a signal.

The computer 24 then compares the signals generated by the pixels in the set, including the characteristics of such signals, such as amplitude.

Specifically, the computer 24 compares the characteristics of the first and second signals S1 and S2 and classifies the emitting light source 11 based on the result of the comparison.

When each set comprises a third pixel P3, the computer 24 is also adapted to compare the characteristics of the first, second and third signals S1, S2, S3 to classify the light source 11.

More generally, the computer 24 compares the characteristics of the signals S1, S2, S3 generated by the adjacent pixels P1, P2 and P3 of each set to classify the emitting light source 11.

For example, the results of the comparison are compared with a database of results for known light sources, allowing the classification of each detected light source.

Comparisons are, for example, made on a detection-by-detection basis, i.e. each time a flux is detected on the sensor 20. For example, detection is achieved when, out of the DC components of the flux received by each pixel P1, P2, P3 in a set, at least one of the pixels measures a positive change in its absolute flux or relative flux above a threshold in a short period of time. A short period of time means a period of time of less than about ten milliseconds.

Alternatively, comparisons are made after several detections, for example after a period of time longer than the duration of a laser shot (on the order of 1 second at most). This makes it easier to classify the light source 11.

Examples of comparison will be described in more detail in the following (first, second and third embodiments).

The computer 24 also determines the direction of the emitting light source 11 relative to the device 14 (angular location) based on the shape and position of the spot T formed on the sensor 20.

For this purpose, the computer 24 estimates, for example, the position of the centre of the spot T formed by the light flux on the sensor 20. Indeed, the occasional event signatures will be disc-shaped (or shaped like a small square area if a square pupil is used) because the laser sources are considered to be distant.

For example, knowing the position of the centre of the spot T, the computer 24 correlates the shape of the spot T to predetermined spot shapes associated with a direction. The direction of the emitting light source 11 is the direction of the predetermined spot shape for which the best correlation is obtained.

Thus, due to its dual functionality (detection and location), the classification device reduces the false alarm rate while allowing for accurate angular location of the emission source.

First Embodiment

A first embodiment of the classification device 14 described in the general description will now be described with reference to FIGS. 2 to 6.

In this first embodiment, the classification device 14 is particularly adapted to detect predetermined laser emissions having, as laser emissions, narrow spectral bands centred on wavelengths of interest. A narrow spectral band is defined as a spectral band less than 100 nanometres (nm) wide. The wavelength of interest is typically the central wavelength of the predetermined laser emission spectral band that is sought to be detected.

For example, the wavelength of interest is in the Short Wave Infra-Red (SWIR) band 1, i.e. the wavelength range between 0.9 micrometres (μm) and 1.7 μm. More precisely, the wavelength of interest for a first family of lasers is between 1.06 μm and 1.07 μm and is advantageously equal to 1.064 μm. In another example, for a second family of lasers, the wavelength of interest is between 1.50 μm and 1.70 μm, preferably between 1 μm and 1.65 μm.

In this first embodiment, the first spectral band B1 is a laser spectral band of interest and the second spectral band B2 is a reference spectral band.

Each laser spectral band of interest is centred on a wavelength of interest. Advantageously, each spectral band of interest is a narrow spectral band.

Each reference spectral band (such as B2) makes it possible to define an illumination reference for each set of pixels P1, P2, P3 by considering a respective illumination threshold beyond which a detection will be made.

Each reference spectral band (such as B2) is selected from the group consisting of:
  (i): a spectral band centred on a different wavelength from the or each wavelength of interest,
  (ii): a spectral band disjoint from the or each spectral band of interest, and
  (iii): a spectral band in which at least one spectral band of interest is strictly included.

Preferably, when the reference spectral band is of type (iii), the reference spectral band is a broad spectral band. A broad spectral band is defined as a spectral band with a width greater than or equal to 100 nm or greater than or equal to twice the width of a spectral band of interest corresponding to a pixel in the same set. When the reference spectral band is of type (i) or (ii), the reference spectral band is either a broad spectral band or a narrow spectral band.

The first pixel P1 comprises a filter suitable for transmitting only the first spectral band B1.

The second pixel P2 comprises a filter suitable for transmitting only the second spectral band B2. The filter of the second pixel P2 is, for example, a high-pass filter.

Where each set comprises a third pixel P3, the third spectral band B3 is a spectral band of interest centred on a different wavelength of interest from the first spectral band B1 (spectral band of interest) or is a reference spectral band different from the second spectral band B2 (reference spectral band). The third pixel P3 comprises a filter suitable for transmitting only the third spectral band of interest B3. Advantageously, when the third spectral band B3 is a spectral band of interest, the filter of the third pixel P3 is a narrow band filter.

Where each set comprises pixels with different filters from the first, second and third pixels P1, P2, P3, the spectral bands of the filters of said pixels P1, P2, P3 are spectral bands of interest or reference spectral bands.

An example of the arrangement of the first, second and third pixels P1, P2, P3 is shown in FIG. 3. In this example, second pixels P2 (reference pixels) are arranged in a periodic pattern on the sensor 20 and first pixels P1 (pixel of interest) and third pixels P3 (pixels of interest or reference) are arranged periodically in the spaces not occupied by the second pixels.

The specific operation of the first embodiment of the classification device 14 will now be described.

In the example shown in FIGS. 2 to 6, the first spectral band B1 is a spectral band centred on the wavelength 1.064 μm. The second spectral band B2 is a broad spectral band comprising all wavelengths from 1.020 μm to 1.7 μm (reference spectral band type (iii)). The third spectral band B3 is a spectral band of interest centred on the wavelength 1.55 μm. Furthermore, in this example, each set comprises four pixels, comprising at least one first pixel P1, at least one second pixel P2 and at least one third pixel P3.

The sensor 20 receives a light flux in the form of a spot T spread over at least one set of pixels of the sensor 20.

In response, each pixel in each light-receiving set detects either the light flux directly, or a change in light flux, or a pulse, or energy, and then generates a signal.

The computer 24 then compares the signals generated by each pixel in each set, including the characteristics of such signals, to classify the light source 11. For this purpose, the computer 24 calculates ratios between the characteristics of the signals generated by the pixels in each set or by related pixels. The signal characteristics considered are, for example, the signal amplitudes. The computer 24 then compares the ratios obtained to at least one predetermined value to classify the emitting light source 11.

In this example, the computer 24 compares the characteristics of the first, second and third signals S1, S2, S3.

For this purpose, in this example, the computer 24 first calculates an adaptive threshold from the continuous flux, its fluctuation and the noise level of the sensor 20. The adaptive threshold is calculated on the basis of the signals generated by the pixels of the sensor 20 over a spatially and temporally sliding calculation area of N times N pixels of the sensor 20 (N being an integer strictly greater than 1). For example, the calculation area is five times five, seven times seven, or nine times nine pixels. The continuous flux and its fluctuation allow the characterisation of the scene background noise (daytime) and the detector noise (nighttime).

In this same example, the computer 24 then identifies the pixels of the sensor 20 corresponding to a spectral band of interest (here the first and third pixels P1, P3) receiving a luminous flux greater than or equal to the adaptive threshold. The fluxes of the identified pixels corresponding to the same spectral band of interest are then correlated by groups of M times M pixels (M being an integer strictly greater than 1). For example, M is equal to two or three. The size of the spot T received on the sensor 20 in this case encompasses at least M times M co-located pixels.

In the area of M times M co-located pixels receiving a flux, the computer 24 compares the characteristics of the signals generated by each pixel or the average values of such characteristics (in the case where several pixels are detected by normalising with respect to the illuminated area).

For example, when the characteristic is an amplitude, the computer 24 calculates the ratios between the amplitudes of the signals generated by the first, second and third pixels P1, P2, P3, which is equivalent to calculating the ratios between the first, second and third spectral bands B1, B2, B3. In the example shown in FIGS. 2 to 6, the ratios calculated are, on the one hand, the ratio B1/B2 between the first spectral band B1 (of interest) and the second spectral band B2 (of reference) and, on the other hand, the ratio B3/B2 between the third spectral band B3 (of interest) and the second spectral band B2 (of reference).

These ratios are then compared to predetermined values, which determine whether or not the emission source is a laser source centred on the wavelength of interest. Advantageously, the estimation of the equivalent temperature of the light source 11 allows a more accurate classification of the source. For example, equivalent temperatures of around 5800 Kelvins (K) will reject a solar reflection. Temperatures below 2000 K will allow the classification of muzzle fires or rocket or missile propulsion.

Figure 4:
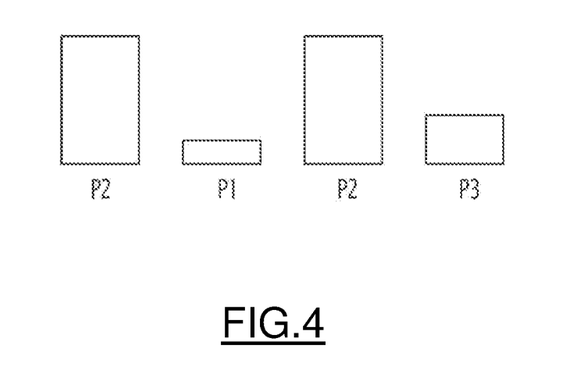
FIG. 4 is a diagram of the response of different pixels receiving solar flux.
Figure 5:
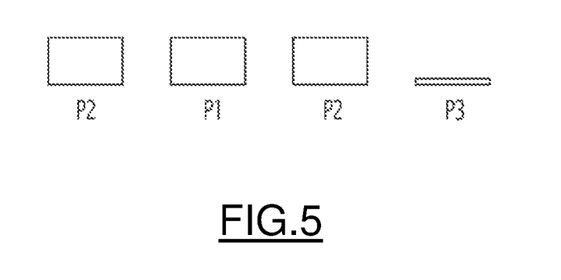
FIG. 5 is a diagram of the response of different pixels receiving a luminous flux in a first spectral band.
Figure 6:
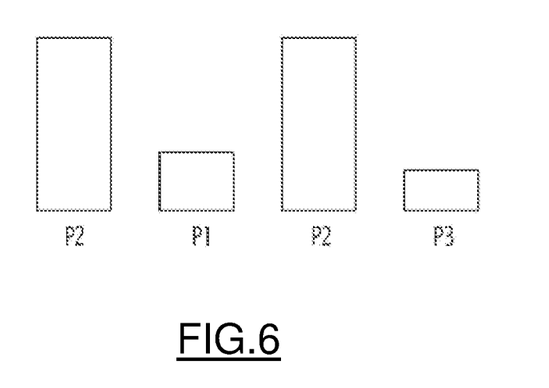
FIG. 6 is a diagram of the response of different pixels receiving a luminous flux in a first spectral band, as well as a solar flux.

By way of illustration, FIGS. 4 to 6 show the responses of the pixels of the sensor 20 to different types of received luminous flux.

When the luminous flux received by the sensor 20 is solar flux (configuration 1), the pixel response is illustrated in FIG. 4. The first pixel P1 receives illumination corresponding to the portion of solar flux in the first spectral band B1. The second pixel P2 receives illumination corresponding to the portion of solar flux in the second spectral band B2. The second spectral band B2 is a wide band, so the second pixel P2 receives more illumination than the first pixel P1. The third pixel P3 receives illumination corresponding to the portion of solar flux in the third spectral band B3. The third spectral band B3 is a narrow band, so the third pixel P3 receives less illumination than the second pixel P2. The ratios B1/B2 and B3/B2 are known because this is the same as performing the ratios of the spectral bands of the pixels. Typically, for a three-pixel defocus, the ratio of B1/B2 is approximately 1/9 and the ratio of B3/B2 is approximately 3/9.

When the luminous flux received by the sensor 20 is solely a laser flux corresponding to the wavelength of interest of the first spectral band B1, thus without parasitic solar reflections (configuration 2), the response of the pixels is illustrated by FIG. 5. The first pixel P1 and the second pixel P2 receive the same illumination and therefore have an identical response. The third pixel P3 receives almost no illumination (except for measurement noise) as the first and third spectral bands B3 are disjoint. Thus, the B1/B2 ratio is approximately equal to 1 and the B3/B2 ratio decreases compared to configuration 1.

When the luminous flux received by the sensor 20 is a laser flux corresponding to the wavelength of interest of the first spectral band B1 and a solar flux is also received on the sensor 20 (configuration 3), the response of the pixels is illustrated by FIG. 6. The first pixel P1 receives an illumination corresponding to the laser flux in the first spectral band B1 and the portion of sunlight reflection in the first spectral band B1. The second pixel P2 receives an illumination corresponding to the laser flux in the first spectral band B1 and the portion of sunlight reflection in the second spectral band B2. The second spectral band B2 is a wide band, so the second pixel P2 receives more illumination than the first pixel P1. The third pixel P3 receives illumination corresponding to the portion of sunlight reflection in the third spectral band B3. The third spectral band B3 is a narrow band, so the third pixel P3 receives less illumination than the first pixel P1. Thus, the B1/B2 ratio increases compared to configuration 1 and the B3/B2 ratio remains approximately the same as in configuration 1.

In another example, the third spectral band B3 is a narrow band disjoint from the first and second bands and the comparative ratios are modified accordingly.

Thus, the classification device 14 according to the first embodiment makes it possible to distinguish laser emissions (in particular in the 1 or SWIR band) from solar reflections by comparing ratios, which reduces the false alarm rate. In particular, in the case of a matrix laser warning detector, the false alarm rate is reduced for the detection of laser streams emitted by, for example, multi-pulse rangefinders, laser designators, active imager illuminators, or the like.

As the sensor 20 of the classification device 14 is a matrix sensor, the precise angular localisation of the emission source is also possible. In addition, such a matrix sensor can perform two functions: a detection function (to classify the emission source) and an imaging function.

In addition, the pixels corresponding to the reference spectral bands allow a local scene illumination reference to be defined. In particular, during the day, the average solar flux reflected from the scene is taken into account.

In addition, the exploitation of the fluxes collected by adjacent pixels makes it possible, beyond the classification of monospectral sources such as the lasers sought (with the B1 and B3 bands), to take measurements related to the fluxes collected in each spectral band in order to estimate their equivalent temperature and thus classify the reflections of solar origin and the sources of pyrotechnic origin (muzzle lights, rocket or missile firings, pyrotechnic decoys) or even lamps, headlights, or beacons.

Thus, the classification device 14 according to the first embodiment reduces the false alarm rate while allowing an accurate angular location of the emission source.

Second Embodiment

Figure 7:
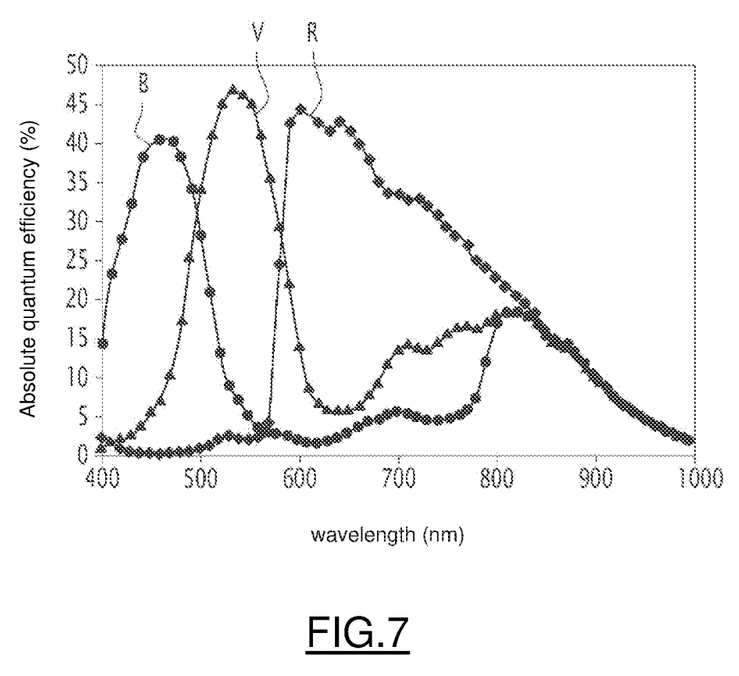
FIG. 7 is a graph showing the spectral profiles of the filters in a Bayer matrix.
Figure 8:
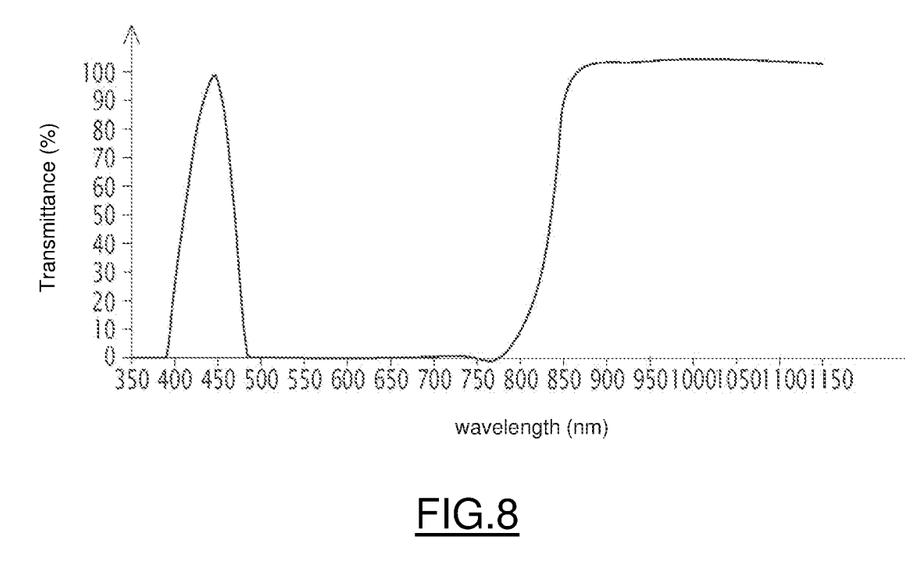
FIG. 8 is a graph showing the spectral profile of a pupil filter.

A second embodiment of the classification device 14 described in the general description will now be described with reference to FIGS. 7 to 9.

In the second embodiment, the classification device 14 is particularly suitable for differentiating a laser pointer emitting in the wavelength band between 800 nm and 900 nm from another light source such as a street light emitting at least in the visible range (380 nm to 780 nm) and possibly in the near infrared range.

In the second embodiment, the first pixel comprises a red Bayer matrix filter or a green Bayer matrix filter, the second pixel comprising a blue Bayer matrix filter. A Bayer matrix (also called a Bayer filter or Bayer mosaic) is composed of 50% green filters, 25% red filters and 25% blue filters, so as to mimic the physiology of the human eye. The filter spectrum of a Bayer matrix is shown in FIG. 7. In this figure, curve R is the spectrum of the red filter of the Bayer matrix, curve V is the spectrum of the green filter of the Bayer matrix and curve B is the spectrum of the blue filter of the Bayer matrix.

Advantageously, the device 14 comprises a pupil filter upstream of the sensor 20. The pupil filter is preferably a notch filter in a wavelength range between 380 nanometres and 850 nanometres. An example of a pupil filter spectrum is shown in FIG. 8.

The first spectral band B1 is the product of the spectrum of the pupil filter (if any) and the spectrum of the first pixel filter P1. The second spectral band B2 is the product of the spectrum of the pupil filter (if any) and the spectrum of the second pixel filter P2.

When the set includes a third pixel P3, the third pixel P3 is the other of the red or green filter of the Bayer matrix or a second green filter. The third spectral band B3 is the product of the spectrum of the pupil filter (if any) and the spectrum of the second pixel filter P2.

When the set includes a fourth pixel P4, the fourth pixel P4 is the remaining pixel of the Bayer matrix. Advantageously, a set may comprise more than four pixels of the Bayer matrix. In this case, the spectral band of each pixel is the product of the spectrum of the pupil filter (if any) and the spectrum of the pixel filter.

Figure 9:
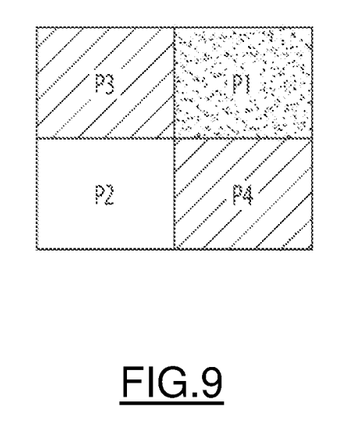
FIG. 9 is a diagram of a set of pixels.

In the example shown in FIG. 9, each set comprises a first pixel P1 with a red filter, a second pixel P2 with a blue filter, a third pixel P3 with a green filter and a fourth pixel P4 with a green filter.

The specific operation of the second embodiment of the classification device 14 will now be described.

The sensor 20 receives a light flux in the form of a spot T spread over at least one set of pixels of the sensor 20.

In response, each pixel in each set receiving the light flux generates a signal.

The computer 24 then compares the characteristics of the signals generated by the pixels in each set to classify the light source 11.

For example, when the characteristic considered is amplitude, a laser pointer emitting in the wavelength band between 800 nm and 900 nm will have an equivalent amplitude for each of the signals generated by the four pixels of the Bayer matrix. On the other hand, for a "bluish-white" street lamp, the signal generated by the blue pixel will have a higher amplitude than the other pixels. This difference therefore makes it possible to distinguish a laser pointer from a broadband street lamp which generally emits in the visible range and can extend into the near infrared range at least in the 800 nm-900 nm wavelength band ("bluish-white" street lamp), and thus to classify the emitting light source.

The pupil filter improves the distinction between a street lamp and a laser pointer. Indeed, without a pupil filter, a white street lamp will have an almost equivalent level on the pixels as a laser pointer.

Thus, the classification device 14 according to the second embodiment makes it possible to better distinguish a flux emitted by a laser pointer from a flux emitted, for example, by a street lamp. This reduces the false alarm rate.

As the sensor 20 of the classification device 14 is a matrix sensor, the precise angular localisation of the emission source is also possible. In addition, such a matrix sensor can perform two functions: a detection function (to classify the emission source) and an imaging function.

Thus, the classification device 14 according to the second embodiment reduces the false alarm rate while allowing an accurate angular location of the emission source.

Third Embodiment

A third embodiment of the classification device 14 described in the general description will now be described with reference to FIG. 10.

In the third embodiment, the classification device 14 is particularly suitable for differentiating a laser pointer emitting in the wavelength band between 800 nm and 900 nm from a broadband street lamp generally emitting in the visible range and being able to emit in the near-infrared range at least in the 800 nm-900 nm band.

In the third embodiment, the first spectral band B1 and the second spectral band B2 are disjoint and have wavelengths between 800 nanometres and 900 nanometres.

The first pixel P1 comprises a filter suitable for transmitting only the first spectral band B1. The second pixel P2 comprises a filter suitable for transmitting only the second spectral band B2.

When each set comprises a third pixel P3, the third spectral band B3 is disjoint from the first and second spectral bands B1, B2 and has wavelengths between 800 nanometres and 900 nanometres. The third pixel P3 comprises a filter suitable for transmitting only the third spectral band B3.

When each set comprises more than three pixels, the spectral band of each pixel is disjoint from the first, second and third spectral bands B1, B2, B3 and comprises wavelengths between 800 nanometres and 900 nanometres. Each pixel has its own filter to transmit only the spectral band of the pixel.

Figure 10:
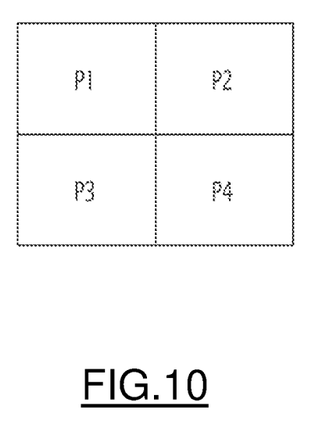
FIG. 10 is a diagram of another set of pixels.

In the example shown in FIG. 10, each set comprises four distinct pixels: a first pixel P1 corresponding to the wavelength range between 800 nm and 825 nm, a second pixel P2 corresponding to the wavelength range between 825 nm and 850 nm, a third pixel P3 corresponding to the wavelength range between 850 nm and 875 nm and a fourth pixel P4 corresponding to the wavelength range between 875 nm and 900 nm.

The specific operation of the third embodiment of the classification device 14 will now be described.

The sensor 20 receives a light flux in the form of a spot T spread over at least one set of pixels of the sensor 20.

In response, each pixel in each set receiving the light flux generates a signal.

The computer 24 then compares the signals generated by each pixel in each set, including the characteristics of such signals, to classify the light source 11.

For example, when the characteristic under consideration is amplitude, a laser pointer emitting in the wavelength band between 800 nm and 900 nm will have a higher amplitude for the signal generated by one of the pixels because the pointer is a narrow band laser. However, a street lamp will have an equivalent amplitude for each of the signals generated by the pixels in the set because such a street lamp emits over a wide band including the 800 nm-900 nm band. This difference makes it possible to distinguish a laser pointer from a street lamp, and thus to classify the emitting light source.

Thus, the classification device 14 according to the third embodiment makes it possible to better distinguish a flux emitted by a laser pointer from a flux emitted by a street lamp. This reduces the false alarm rate.

As the sensor 20 of the classification device 14 is a matrix sensor, the precise angular localisation of the emission source is also possible. In addition, such a matrix sensor can perform two functions: a detection function (to classify the emission source) and an imaging function.

Thus, the classification device 14 according to the third embodiment reduces the false alarm rate while allowing an accurate angular location of the emission source. In addition, it allows the broadband sources detected to be classified by their spectral classification.

The skilled person will appreciate that the above-described embodiments can be combined to form new embodiments, provided that they are technically compatible.

For example, similar to the second embodiment, a pupil filter could be added upstream of the sensors of the first and third embodiments.

In another embodiment, the sensor could comprise, for each set, an interleaving of pixels according to the first, and/or the second and/or the third embodiment.

The invention claimed is:

1. A device for classifying a light source comprising:
   a sensor adapted to receive a luminous flux emitted by at least one light source, the luminous flux being received on the sensor in the form of a spot, the sensor comprising a plurality of pixels grouped into sets, each set comprising at least a first pixel and a second pixel, the second pixel being adjacent to the first pixel, each first pixel being adapted to generate a first signal relating to a first portion of luminous flux in a first spectral band received by said first pixel, each second pixel being adapted to generate a second signal relating to a second portion of luminous flux in a second spectral band received by said second pixel, the second spectral band being different from the first spectral band, a unit for controlling the size and shape of the spot so that the spot extends over at least one set of pixels of the sensor, and a computer configured to compare the first and second signals and to classify the emitting light source according to the result of the comparison.

2. The device according to claim 1, wherein the computer is configured to determine the direction of the emitting light source relative to the device based on the shape and position of the spot on the sensor.

3. The device according to claim 1, wherein each set comprises at least a third pixel of the plurality of pixels of the sensor, each third pixel being adapted to generate a third signal relating to a third portion of luminous flux in a third spectral band received by said third pixel, the third spectral band being different from the first spectral band and the second spectral band, the computer being configured to compare the first, second and third signals to classify the emitting light source.

4. The device according to claim 3, wherein the arrangement of the pixels in each set is predefined and is advantageously identical from one set to another.

5. The device according to claim 1, wherein at least one spectral band of interest is defined, the first spectral band is a spectral band of interest and the second spectral band is a reference spectral band, each spectral band of interest being centered on a wavelength of interest, each reference spectral band being selected from the group consisting of:

a spectral band centered on a different wavelength from the or each wavelength of interest, a spectral band disjoint from the or each spectral band of interest, and a spectral band in which at least one spectral band of interest is strictly included, the first pixel comprising a filter suitable for transmitting only the first spectral band, the second pixel comprising a filter suitable for transmitting only the second spectral band.

6. The device according to claim 5, wherein the third spectral band is a spectral band of interest centered on a wavelength of interest different from the first spectral band, or a reference spectral band different from the second spectral band, the third pixel comprising a filter adapted to transmit only the third spectral band.

7. The device according to claim 5, wherein at least one wavelength of interest is between 1.05 microns and 1.07 microns or between 1.50 microns and 1.70 microns.

8. The device according to claim 5, wherein at least one wavelength of interest is between 1.55 microns and 1.65 microns.

9. The device according to claim 1, wherein the first pixel comprises a red Bayer matrix filter or a green Bayer matrix filter, the second pixel comprising a blue Bayer matrix filter.

10. The device according to claim 9, wherein the device comprises a pupil filter upstream of the sensor, the first spectral band being the product of the spectrum of the pupil filter and the spectrum of the filter of the first pixel, the second spectral band being the product of the spectrum of the pupil filter and the spectrum of the filter of the second pixel.

11. The device according to claim 10, wherein the pupil filter is a notch filter in a wavelength range between 380 nanometres and 850 nanometres.

12. The device according to claim 1, wherein the first spectral band and the second spectral band are disjoint and comprise wavelengths between 800 nanometers and 900 nanometers.

13. An optronic system comprising a classification device according to claim 12.

* * * * *